(12) United States Patent
Park et al.

(10) Patent No.: US 10,284,016 B2
(45) Date of Patent: May 7, 2019

(54) SYSTEM FOR MULTI-BAND POWER TRANSMISSION WITH MULTIPLE PROTOCOLS

(71) Applicant: LG INNOTEK CO., LTD., Seoul (KR)

(72) Inventors: Soo Young Park, Seoul (KR); Su Bin Park, Seoul (KR); Jong Heon Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 429 days.

(21) Appl. No.: 15/162,179

(22) Filed: May 23, 2016

(65) Prior Publication Data
US 2016/0359370 A1    Dec. 8, 2016

(30) Foreign Application Priority Data

Jun. 5, 2015  (KR) .......................... 10-2015-0079874

(51) Int. Cl.
*H02J 7/02* (2016.01)
*H02J 50/12* (2016.01)
*H02J 50/20* (2016.01)
*B60L 11/18* (2006.01)

(52) U.S. Cl.
CPC ............. *H02J 50/12* (2016.02); *B60L 11/182* (2013.01); *H02J 7/025* (2013.01); *H02J 50/20* (2016.02)

(58) Field of Classification Search
None
See application file for complete search history.

(56) References Cited

U.S. PATENT DOCUMENTS

| | | | | |
|---|---|---|---|---|
| 9,662,161 B2* | 5/2017 | Ganem | ................... | H02J 5/005 |
| 2008/0054638 A1* | 3/2008 | Greene | ................... | H02J 17/00 |
| | | | | 290/1 R |
| 2015/0042173 A1* | 2/2015 | Lee | ................... | H02J 17/00 |
| | | | | 307/104 |
| 2016/0020634 A1* | 1/2016 | Kanno | ................... | H02J 17/00 |
| | | | | 320/108 |

* cited by examiner

*Primary Examiner* — Jared Fureman
*Assistant Examiner* — Joel Barnett
(74) *Attorney, Agent, or Firm* — Birch, Stewart, Kolasch & Birch, LLP

(57) ABSTRACT

An apparatus for receiving a wireless power signal includes a detection unit configured to discover a power signal having plural components, each generated by plural wireless charging techniques, a recognition unit configured to analyze the power signal to recognize which component of the power signal can be corresponding to each of the plural wireless charging techniques, a combination unit configured to combine outputs of the recognition unit into a single energy signal, and a charging unit configured to use the energy signal for charging a battery.

16 Claims, 5 Drawing Sheets

SYSTEM FOR MULTI-BAND POWER TRANSMISSION WITH MULTIPLE PROTOCOLS

CROSS-REFERENCE TO RELATED APPLICATION

This application claims priority to and the benefit of Korean Patent Application No. 10-2015-0079874, filed on Jun. 5, 2015 in the Korean Intellectual Property Office, the disclosure of which is hereby incorporated by reference as if fully set forth herein.

TECHNICAL FIELD

The disclosure relates to a wireless charging technology, and more particularly, to an apparatus and a method for transmitting or receiving a wireless power signal via a multi-band channel which is available and operable for different wireless charging techniques.

BACKGROUND

As a wireless communication technology becomes developed dramatically, it is generalized to transmit and/or receive information including a video, an audio and so on. Recently, delivering energy (or a power) via a wireless communication channel can be realized.

A wireless charging technology uses an electrical signal having a specific frequency. For example, techniques of electromagnetic induction or magnetic resonance, which uses a non-radial attenuated AC signal existing near coils placed adjacently with each other, have been developed. Further, other techniques of a microwave signal and a radio frequency signal, which uses an electrical signal having a short-wavelength wireless signal transmitted via an antenna, are focused gradually.

Plural above-described wireless charging techniques suggested and/or developed by many researchers may not be comparable directly. To overcome above-described issues, in even circumstance where two different methods using coils based on electromagnetic induction, e.g., wireless charging techniques standardized by the Wireless Power Consortium (WPC) and the Power Matters Alliance (PMA), are applied, an apparatus or a system has been suggested for automatically choosing one of two methods without an additional software or device so as to transmit a power signal. However, in a circumstance where plural wireless charging methods or technologies are supported, there has been suggested no apparatus or method capable of transmitting a power signal via combined one of the plural wireless charging methods or technologies.

SUMMARY

In a wireless charging system, an apparatus or a method for transmitting or receiving a power signal can use a combination of plural wireless charging methods or techniques which may be even standardized by different organizations.

In a wireless charging device transmitting a power signal via plural wireless charging methods or techniques, an efficiency of wireless charging can be improved.

An apparatus for receiving a wireless power signal can include a detection unit configured to discover a power signal having plural components, each generated by plural wireless charging techniques, a recognition unit configured to analyze the power signal to recognize which component of the power signal can be corresponding to each of the plural wireless charging techniques, a combination unit configured to combine outputs of the recognition unit into a single energy signal, and a charging unit configured to use the energy signal for charging a battery.

The plural wireless charging techniques can include a charging method using at least one of electromagnetic induction, magnetic resonance and a radio frequency signal.

The plural wireless charging techniques can include plural charging method using the electromagnetic induction but transceiving a combination signal of power signals or feedback signals which have different structures and/or information.

The charging method using the electromagnetic induction can include at least one way which is standardized by the Wireless Power Consortium (WPC) and/or the Power Matters Alliance (PMA), the charging method using the magnetic resonance comprises a way which is standardized by the Alliance for Wireless Power (A4WP), and the charging method using the radio frequency signal comprises a way using a radio-wave or a microwave.

The detection unit can include at least one of a coil and an antenna which is operable according to the plural wireless charging techniques.

The recognition unit can include at least one frequency filter for passing the power signal with a particular frequency band.

The apparatus can further include a control unit configured to control that the power signal is dynamically analyzed and/or combined by the recognition unit and/or the combination unit according to a power receiving efficiency, a level of voltage or current, or a requirement for a subject charging device, or to engage with a processing system equipped in the apparatus or an external device so as to control the recognition unit and/or the combination unit.

The control unit can include a feedback unit configured to feedback operational results of the recognition unit and/or the combination unit.

The combination unit can include a power combiner.

The apparatus can further include a reference signal generator configured to generate a reference signal used for effectively detecting the plural components of the power signal in a case when the power signal includes the plural components generated based on the plural wireless charging techniques, and to supply the reference signal into the detection unit.

A method for receiving a wireless power signal can include discovering a power signal having plural components, each generated by plural wireless charging techniques; analyzing the power signal to recognize which component of the power signal can be corresponding to each of the plural wireless charging techniques; combining recognized signals into a single energy signal; and charging a battery by using the energy signal.

The plural wireless charging techniques can include a charging method using at least one of electromagnetic induction, magnetic resonance and a radio frequency signal.

The charging method using the electromagnetic induction can include at least one way which is standardized by the Wireless Power Consortium (WPC) and/or the Power Matters Alliance (PMA), the charging method using the magnetic resonance comprises a way which is standardized by the Alliance for Wireless Power (A4WP), and the charging method using the radio frequency signal comprises a way using a radio-wave or a microwave.

The discovering a power signal can include controlling at least one of a coil and an antenna according to the plural wireless charging techniques.

The combining outputs of the recognition unit can include controlling at least one frequency filter for disassembling the power signal with a particular frequency band.

The combining outputs of the recognition unit can include adjusting a coupling factor of the outputs of the recognition unit.

The analyzing the power signal and the combining recognized signals can be controlled according to a power receiving efficiency, a level of voltage or current, or a requirement for a subject charging device.

The method can further include feeding back results of the analyzing the power signal and the combining recognized outputs.

An apparatus for transmitting a wireless power signal can include a signal generator configured to generate plural power signals which are transferred according to plural wireless charging techniques; a mixer configured to mix the plural power signals according to a combination possibility of the plural power signals; and a transmitter configured to transmit one of the plural power signals and a mixed signal of the plural power signals.

The combination possibility can be determined based on the plural wireless charging techniques, and if the plural power signals have no combination possibility, the mixer can deliver the plural power signals into the transmitter respectively.

An apparatus is for receiving a wireless power signal in a wireless power receiver comprising a processing system that comprises at least one data processor and at least one computer-readable memory storing a computer program. The processing system causes the apparatus to discover a power signal having plural components, each generated by plural wireless charging techniques; analyze the power signal to recognize which component of the power signal can be corresponding to each of the plural wireless charging techniques; combine recognized signals into a single energy signal; and charge a battery by using the energy signal.

The effects obtained from the disclosure are not limited to the above-described effects and the other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
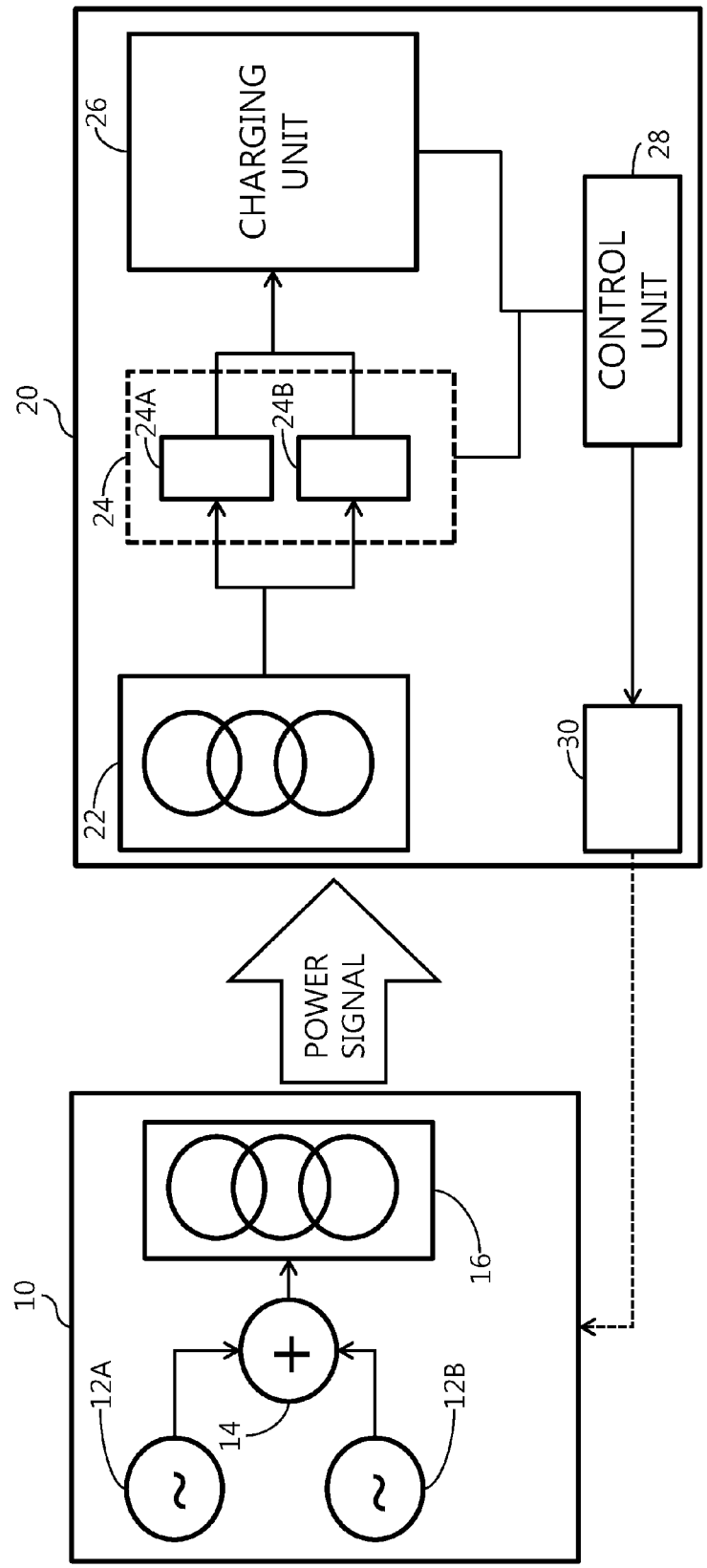
FIG. 1 describes an apparatus for transmitting or receiving a wireless power signal.

Reference will now be made in detail to the preferred embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the disclosure, certain detailed explanations of related art may be omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

In following embodiments, an apparatus configured for transmitting a wireless power signal in a wireless power charging system may be used interchangeably with a wireless power transmitter, a wireless power transmission apparatus, a transmission end, a transmitter, a transmission apparatus, transmission side, and etc. Further, an apparatus configured for receiving a wireless power signal delivered from a wireless power transmitter may be used interchangeably with a wireless power reception apparatus, a wireless power receiver, a reception terminal, a reception side, a reception apparatus, a receiver, and the like.

By the way of example but not limitation, a wireless power transmitter can be configured in the form of a pad, a cradle, an access point (AP), a small base station, a stand, a ceiling insert type, a wall-hanging type, a vehicle insert type, a vehicle mount type, or the like. A single transmitter can simultaneously deliver a power signal into a plurality of wireless power reception apparatuses.

A wireless power transmission element applied to the disclosure can use various wireless power transmission standards based on an electromagnetic induction method of charging according to the electromagnetic induction principle that a magnetic field is generated from a coil of a power transmission end and electricity is induced from a coil of a reception end under the influence of the magnetic field. Here, the wireless power transmission standards of the electromagnetic induction method may include wireless charging technology of an electromagnetic induction method defined in the Wireless Power Consortium (WPC) and/or the Power Matters Alliance (PMA).

As another example, a wireless power transmission element can use an electromagnetic resonance method of synchronizing a magnetic field generated by a transmission coil of a wireless power transmitter with a specific resonance frequency and transmitting power to an adjacently located wireless power receiver. For the way of example but not limitation, the electromagnetic resonance method can include wireless charging technology of a resonance method defined in the Alliance for Wireless Power (A4WP) as a wireless charging technology standard organization.

As another example, a wireless power transmission element can use an RF wireless power transmission method of transmitting power to a wireless power receiver positioned a long distance away with a low-energy RF signal.

As another example, a wireless power transmitter can be designed to support at least two wireless power transmission methods of the aforementioned electromagnetic induction method, electromagnetic resonance method, and RF wireless power transmission method.

A wireless power receiver can be mounted on a small-size electronic apparatus such as a mobile phone, a smartphone, a laptop, a digital broadcasting terminal, a personal digital assistants (PDA), a portable multimedia player (PMP), a navigation system, an MP3 player, an electric toothbrush, a radio frequency identification (RFID) tag, an illumination apparatus, a remote controller, and a bobber, without being limited thereto. Accordingly, the wireless power receiver may be any device as long as the wireless power receiver includes the wireless power reception element according to the disclosure to wirelessly receive power or to charge a battery. A wireless power receiver according to another embodiment of the disclosure may also be installed in home appliances including a TV, a refrigerator, a washing machine, etc., a vehicle, an unmanned aerial vehicle, AR. drone, a robot, and so on.

FIG. 1 describes an apparatus for transmitting or receiving a wireless power signal.

As shown, a wireless power transmitter 10 can transmit a wireless power signal into a wireless power receiver 20, while the wireless power receiver 20 delivers a feedback signal into the wireless power transmitter 10.

The wireless power transmitter 10 can include a mixer 14 configured to mix plural power signals 12A, 12B generated based on two different wireless charging techniques, and a transmitter 16 configured to transmit a mixed signal generated from the mixer 14. Herein, the transmitter 16 can include a coil or an antenna for transmitting a power signal according to a wireless power transmitting technique.

The wireless power receiver 20 can include a receiving unit 22 configured to receive a power signal delivered from the wireless power transmitter 10, a filtering unit 24 configured to split the received power signal into plural signals according to the plural wireless charging techniques, a charging unit 26 configured to charge loads or a battery by using the plural signals outputted from the filtering unit 24, a controlling unit 28 configured to control operations of the filtering unit 24 and the charging unit 26, and a feedback communication unit 30 configured to feedback information checked by the controlling unit 28 such as statuses or operational results.

Plural wireless charging techniques which have been suggested and developed can adopt different frequency bands or different channels used for transmitting a wireless power signal. Accordingly, even if a received signal is a sort of the mixed signal or the combined signal of plural wireless power signals generated based on different wireless charging techniques, the wireless charging receiver 20 can disassemble the received signal into plural components when the wireless charging receiver 20 includes plural frequency filters 24A, 24B for extracting a specific signal with different frequency band from a mixed signal or a combined signal.

Figure 2:
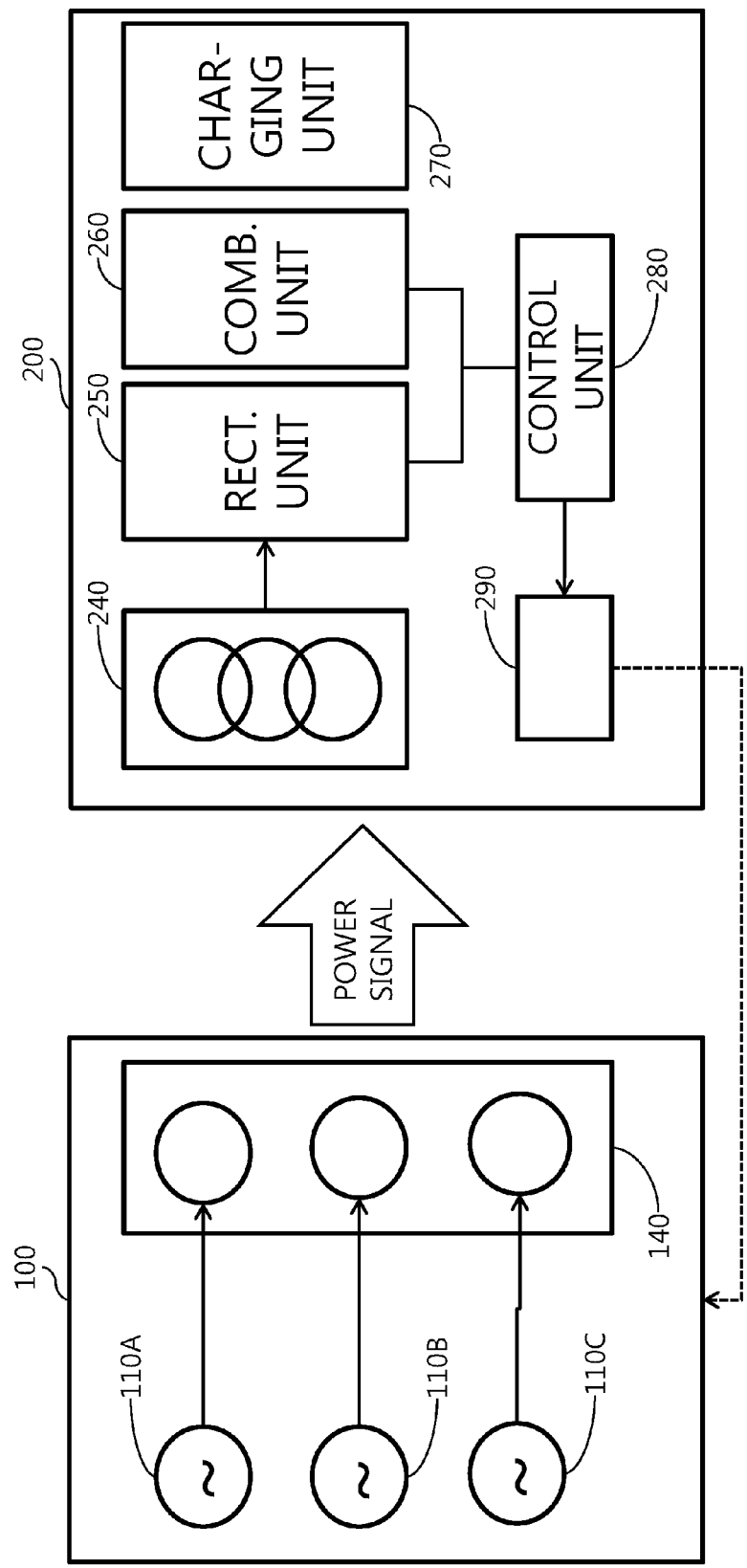
FIG. 2 shows a system for transmitting or receiving a wireless power signal.

FIG. 2 shows a system for transmitting or receiving a wireless power signal.

As shown, the system for transmitting or receiving the wireless power signal can include a wireless power transmitter 100 configured to transmit a wireless power signal and a wireless power receiver 200 configured to receive the wireless power signal.

The wireless power transmitter 100 can include first, second and third signal generators 110A, 110B, 110C configured to generate plural power signals transmitted via plural wireless power charging techniques, and a transmitter 140 configured to transmit the plural power signals or a mixed signal of the plural power signals. Herein, the first, second and third signal generators 110A, 110B, 110C can generate a power signal according to different wireless power charging techniques. The transmitter 140 can include plural coils or antennas to transmit the plural power signals, each generated by each of the first, second and third signal generators 110A, 110B, 110C.

The wireless power receiver 200 can include a detection unit 240 configured to discover a power signal having plural components, each generated by plural wireless charging techniques, a rectification unit 250 configured to recognize the plural components of the power signal, a combination unit 260 configured to combine outputs of the recognition unit into a single energy signal, and a charging unit 270 configured to use the energy signal for charging a battery. Herein, an alternating current (AC) power signal outputted from the detection unit 240 should be converted into a direct current (DC) power signal after rectified. The conversion can be occurred in the rectification unit 250 or the combination unit 260. Further, the charging unit 270 can include a connection port for supplying a power signal into a subject battery or loads.

The wireless power receiver 200 can include a control unit 280 configured to control that the power signal is dynamically analyzed by the rectification unit 250 and/or combined by the combination unit 260 according to a power receiving efficiency, a level of voltage or current, or a requirement for a subject charging device, or to engage with a processing system equipped in the apparatus or an external device so as to autonomously control the rectification unit 250 and/or the combination unit 260. Herein, the control unit 280 can avoid an operational issue such as an overcharge due to an overcurrent or overvoltage. Further, the wireless power receiver 200 can include a feedback unit 290 configured to feedback an operational result of the control unit 280.

The detection unit 210 included in the wireless power receiver 200 can include at least one coil and/or at least one antenna which is operable according to the plural wireless charging techniques. The rectification unit 250 can include at least one frequency filter configured to pass a power signal with a specific frequency band so as to split the power signal into plural signals according to the plural wireless charging techniques. The combination unit 260 can include a power combiner. Herein, according to which wireless charging technique the wireless power signal is generated based on, the power combiner in the combination unit 260 can have different structures and/or operate in different ways.

The plural wireless charging techniques used in the system for transmitting or receiving a wireless power signal can include a charging method using electromagnetic induction or magnetic resonance occurred between two coils, and another method using a radio frequency (RF) signal. For the way of example but not limitation, the plural wireless charging techniques used in the wireless power transmitter 100 and the wireless power receiver 200 can include a charging method using at least one of electromagnetic induction, magnetic resonance and a radio frequency signal.

As an electromagnetic induction charging method is a kind of techniques utilizing electromagnetic induction occurred between coils as a means for transceiving a power signal, and is mainly commercialized for charging a small device such as a mobile phone. The electromagnetic induction charging method can transfer a power signal of the maximum a few hundred kW, and its transmission efficiency is considered great. However, since its maximum transmission distance may be less than 1 cm, a subject device (charging target) should be placed adjacent to a charging device, e.g., on a body or a pad of the charging device.

The electromagnetic induction charging method is standardized by the Wireless Power Consortium (WPC) and the Power Matters Alliance (PMA) individually. In a WPC method, a wireless power transmission can be achieved similar to a digital communication where plural packets are transferred between a transmitter and a receiver. Herein, the packet can be encoded in a differential bi-phase (DBP), and a bit rates may be 2 kB/s. The WPC method uses a frequency band of a few hundred Hz (e.g., about 100 to 205 kHz). The transmitter and the receiver can individually include coils which can be coupled to each other via an electromagnetic field. The electromagnetic field can be converged on a small space between coils of the transmitter and the receiver. Typically, a single transmitter can transmit a power signal to a single receiver at a time, but if plural coils are equipped in the transmitter, the single transmitter can transmit plural power signals to plural receivers.

In a PMA method, dislike the WPC method, a power signal is continuously transferred from a transmitter to a receiver. The PMA method can use six different communication symbols as well as adopt different protocols and transmission frequencies within a few hundred kHz (e.g., less than about 300 kHz) so that transceiving a single power signal as well as plural different power signals could be available.

Distinguishable from the electromagnetic induction charging method, a magnetic resonance charging method can utilize magnetic resonance, not electromagnetic induction, between coils. As compared with the electromagnetic induction charging method, the magnetic resonance charging method can transmit a wireless power signal farther, so the wireless power signal can be transferred about a dozen centimeter (cm) to a few meter (m) according to a size or a performance of coils coupled with each other via magnetic resonance. Further, since the magnetic resonance charging method can go over a larger distance or have more freedom in positioning the transmitter and the receiver relative to each other, a wireless power signal can be transferred between them regardless of their positions within a short distance. Further, the magnetic resonance charging method can deliver a wireless power signal into a subject device responding the same frequency signal, so the wireless power signal would be for nothing in another device adjacent to, or between, a transmitter and a receiver. Because the magnetic resonance charging method can be free to an adverse effect of electromagnetic waves, other devices and human beings can be safe.

A short-wavelength charging method (e.g., a RF charging method) can transmit an electrical signal of radiowave or microwave via an antenna. The short-wavelength charging method based on antenna radiation can use a few gigahertz (GHz) frequency signals. In short-wavelength charging method, a transmission distance can be over several meters (m) or a few kilometers (km) so that it is applicable to a long-distance wireless power transmission or an electric vehicle charging.

The wireless power transmitter 100 can adopt plural wireless charging techniques among above-described methods to transmit a wireless power signal into the wireless power receiver 200.

The detection unit 210 included in the wireless power receiver 200 can include at least one coil and/or at least one antenna which is operable according to the plural wireless charging techniques. The rectification unit 250 can include at least one frequency filter configured to pass a power signal with a specific frequency band so as to split the power signal into plural signals according to the plural wireless charging techniques. The combination unit 260 can include a power combiner, which may have different structures and/or operate in different ways according to which wireless charging technique the wireless power signal is generated based on.

The wireless power receiver 200 can include a control unit 280 configured to control that the power signal is dynamically analyzed by the rectification unit 250 and/or combined by the combination unit 260 according to a power receiving efficiency, a level of voltage or current, and/or a requirement for a subject device, or to engage with a processing system equipped in the apparatus or an external device so as to autonomously control the rectification unit 250 and/or the combination unit 260. Further, the wireless power receiver 200 can include a feedback unit 290 configured to feedback an operational result of the control unit 280.

For the way of example but not limitation, after measuring an efficiency of each wireless power signal transmitted according to each of the plural wireless charging techniques, the control unit 280 can ignore some of transmitted wireless power signals, which would have a low efficiency, and select the others of transmitted wireless power signals, which would have a high efficiency, for charging a subject battery. Further, the control unit 280 can choose some of them according to a voltage level. Herein, the control unit 280 can control the charging unit 270 to avoid an overcharge due to an overcurrent or overvoltage.

Even though not choosing some of the transmitted wireless power signals, the control unit 280 can measure or check a transmission status regarding each of the transmitted wireless power signals so as to feedback the transmission status into the wireless power transmitter 100. As not shown in FIGS. 1 and 2, the control unit 280 can control the detection unit 210 in order to enhance an efficiency of discovering the transmitted wireless power signals according to their transmission status.

Figure 3:
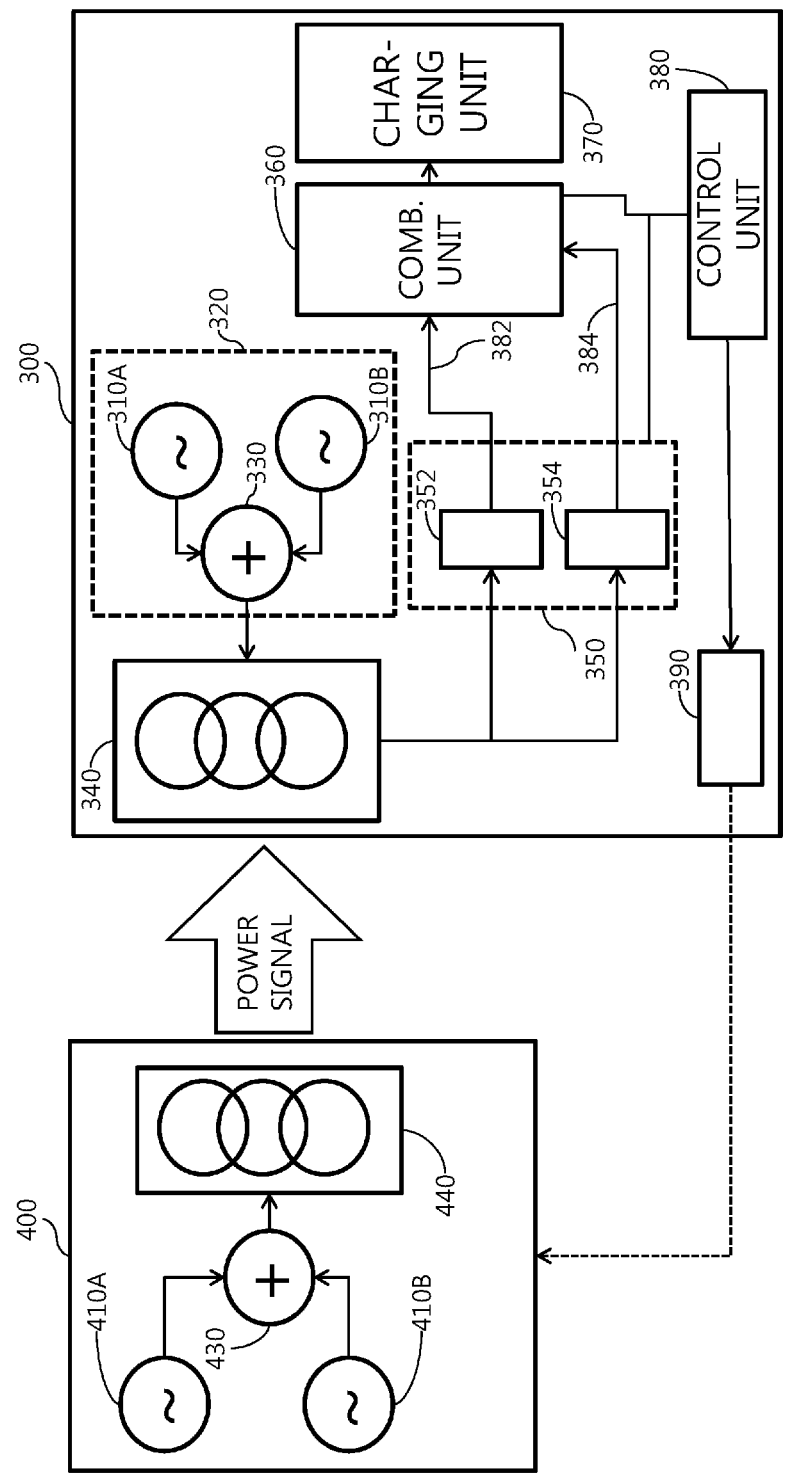
FIG. 3 shows a system using plural wireless charging methods for transmitting or receiving a wireless power signal.

FIG. 3 shows a system using plural wireless charging methods for transmitting or receiving a wireless power signal.

As shown, a wireless power transmitter 400 can include a signal generator 410A, 410B configured to generate plural power signals which are transferred according to plural wireless charging techniques, a mixer 430 configured to mix the plural power signals according to a combination possibility of the plural power signals, and a transmitter 440 configured to transmit one of the plural power signals and a mixed signal of the plural power signals.

The wireless power transmitter 100 shown in FIG. 2 can wirelessly transmit plural power signals generated based on plural wireless charging techniques as compartmental, while the wireless power transmitter 400 can wirelessly transmit the plural power signals as mixed or combined.

A wireless power receiver 300 can include a detection unit 340, a ratification unit 350, a combination unit 360, a charging unit 270, a control unit 380, a feedback unit 390, and a reference signal generator 320. Herein, difference between the wireless power receiver 200 shown in FIG. 1 and the wireless power receiver 300 is described.

When plural power signals generated according to plural wireless charging techniques are mixed and transmitted wirelessly, the reference signal generator 320 can supply a reference signal into the detection unit 340 in order that the detection unit 340 can effectively detect a mixed signal of the plural power signals.

For the way of example but not limitation, the reference signal generator 320 can include first and second reference generating units 310A, 310B and a reference mixing unit 330. Herein, the first and second reference generating units 310A, 310B and the reference mixing unit 330 included in the wireless power receiver 300 can be implemented or designed by using replicas of the first and second signal generators 410A, 410B and the mixer 430 included in the wireless power transmitter 400.

If a power signal detected by the detection unit 340 passes through plural filters 352, 354 included in the rectification unit 350, recognized signals 382, 384 can be outputted. The control unit 380 in the wireless power receiver 300 can compares the recognized signals 382, 384 with reference signals outputted from the first and second reference generating units 310A, 310B so as to track a change. As not shown, an AC signal delivered by the detection unit 340 should be converted into a DC signal for charging a battery or loads. This conversion function can be included in the rectification unit 350 or the combination unit 360. For example, the recognized signal 382, 384 can be combined by the combination unit 360 after converted into a DC signal.

Figure 4:
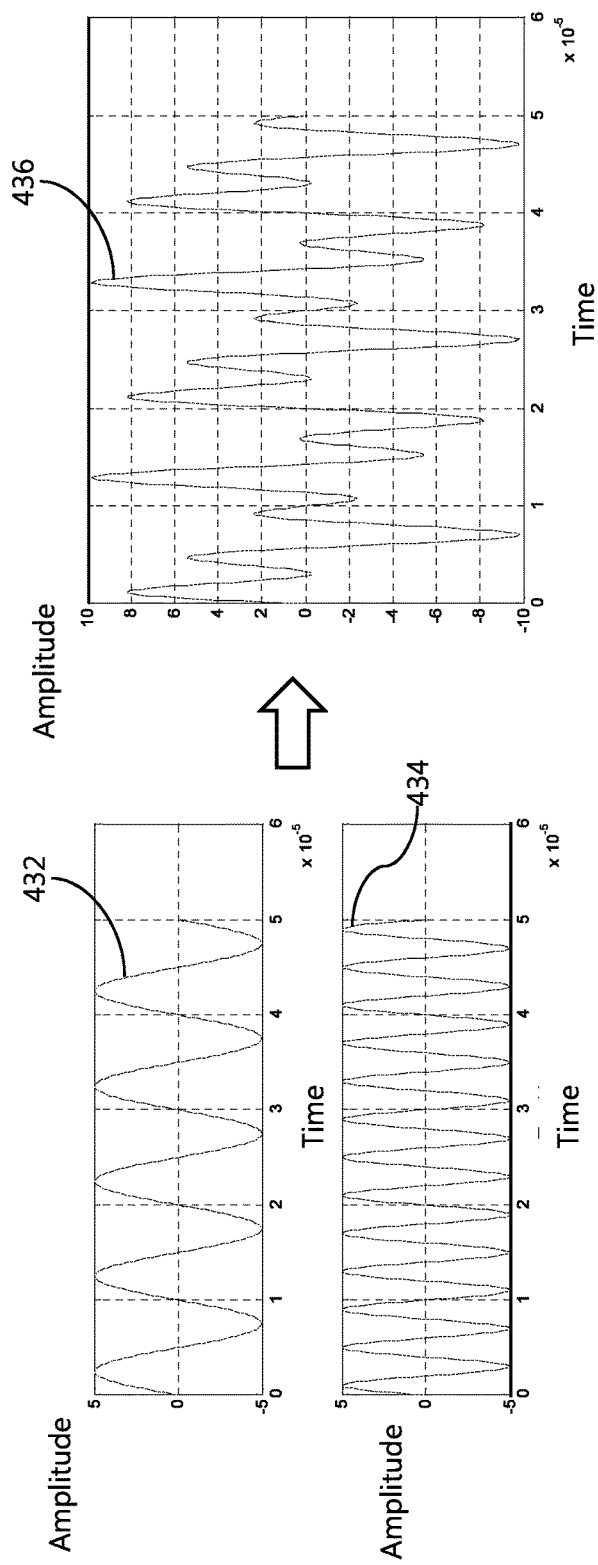
FIG. 4 shows a mixer included in a wireless power transmitter.

FIG. 4 shows the mixer 430 included in a wireless power transmitter 400.

As shown, the mixer 430 can mix first and second power signals 432, 434 which could be transmitted based on different wireless charging techniques into a single mixed or combined signal 436 according to a combination possibility of the plural power signals. For the way of example but not limitation, if the first and second power signals having two different frequencies 400 kHz and 250 kHz are mixed, the mixed signal 436 can have a waveform shown in FIG. 4. Herein, the combination possibility can be determined based on the plural wireless charging techniques. If the plural power signals may have no combination possibility, the plural power signals can be delivered to the transmitter 440 respectively.

For the way of example but not limitation, the transmitter 440 included in the wireless power transmitter 400 can transmit a wireless power signal to a target device based on electromagnetic induction. In this case, plural different wireless charging techniques using electromagnetic induction between coils but different wireless signals having different components and/or characteristics (e.g., the WPC method and the PMA method) can be mixed by the mixer 430, and then a mixed signal can be transferred by the transmitter 440 via electromagnetic induction.

Figures 5A, 5B:
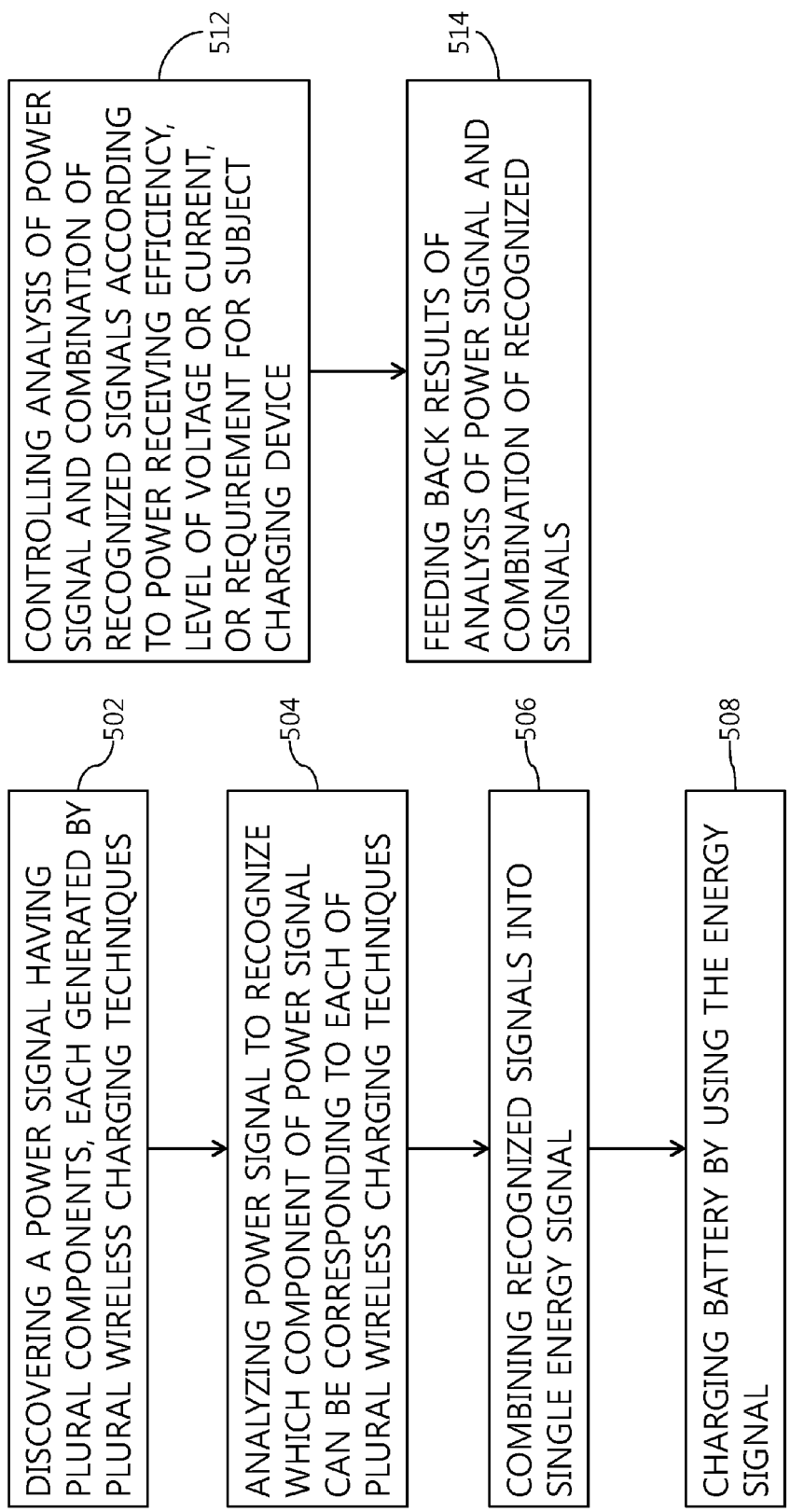
FIGS. 5A and 5B shows operations of an apparatus for receiving a wireless power signal.

FIGS. 5A and 5B shows operations of an apparatus for receiving a wireless power signal.

Referring to FIG. 5A, a method for receiving a wireless power signal can include discovering a power signal having plural components, each generated by plural wireless charging techniques (step 502). In order that a wireless power receiver can discover or detect a power signal, at least one coil or antenna can be controlled according to the plural wireless charging techniques. The wireless power receiver can analyze the power signal to recognize which component of the power signal can be corresponding to each of the plural wireless charging techniques (step 504). At least one frequency filter can be equipped in the wireless power receiver to split the power signal into plural signals and recognize plural signals as a power signal according to each of plural wireless charging techniques. The wireless power receiver can combine recognized signals into a single energy signal (step 506). The wireless power receiver can adopt various methods for combining plural recognized signals. For the way of example but not limitation, the wireless power receiver can adjust a polarity of some recognized signal and combine all recognized signals so as to increase an electrical energy. The wireless power receiver can charge a battery or loads by using the energy signal (step 508).

Referring to FIG. 5B, in order to receive a power signal, the wireless power receiver can control steps of analyzing the power signal and combining recognized outputs according to a power receiving efficiency, a level of voltage or current, or a requirement for a subject charging device (step 512). Further, the wireless power receiver can feedback results in steps of analyzing the power signal and combining recognized outputs into a wireless power transmitter (step 514).

In above-described embodiments, since a wireless signal having plural components of different frequencies can be analyzed simultaneously, a wireless charging device can quickly discover which an applicable method or technique can be supported by an apparatus for receiving a wireless power signal.

Since a wireless charging device can handle plural signals having different frequencies simultaneously, the wireless charging device can perform plural wireless charging operations to plural devices simultaneously.

Further, because a wireless charging device can use plural wireless charging methods simultaneously, a wireless charging efficiency of the wireless charging device can be enhanced, and the wireless charging device can be used for charging a massive battery or a massive battery system.

The aforementioned embodiments are achieved by combination of structural elements and features of the invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the invention. The order of operations described in the embodiments of the invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. An apparatus for receiving a wireless power signal, comprising:
   a detection unit detecting an AC power signal having a plurality of components generated by a plurality of wireless charging techniques;
   a reference signal generator generating a reference signal used for detecting and filtering the plurality of components of the AC power signal when the AC power signal includes the plurality of components generated based on the plurality of wireless charging techniques, and supplying the reference signal to the detection unit;
   a recognition unit analyzing the AC power signal to recognize a wireless charging technique corresponding to each of the plurality of components of the AC power signal using a plurality of filters to generate filtered signals, and rectifying the filtered signals to generate rectified signals;
   a combination unit combining the rectified signals into a single DC signal; and
   a charging unit controlling the single DC signal for charging a battery,
   wherein the plurality of wireless charging techniques comprise a first electromagnetic induction method and a second electromagnetic induction method, and the first electromagnetic induction method has a power signal and a feedback signal of different structure and/or different information than a power signal and a feedback signal of the second electromagnetic induction method.

2. The apparatus according to claim 1, wherein the plurality of wireless charging techniques further comprise a charging method using at least one of magnetic resonance and a radio frequency signal.

3. The apparatus according to claim 2, wherein the electromagnetic induction method comprises a way which is standardized by the Wireless Power Consortium (WPC), the second electromagnetic induction method comprises a way which is standardized by the Power Matters Alliance (PMA), the charging method using the magnetic resonance comprises a way which is standardized by the Alliance for Wireless Power (A4WP), and the charging method using the radio frequency signal comprises a way using a radio-wave or a microwave.

4. The apparatus according to claim 1, wherein the detection unit comprises at least one of a coil and an antenna which is operable according to the plurality of wireless charging techniques.

5. The apparatus according to claim 1, wherein the recognition unit comprises at least one frequency filter for passing the AC power signal with a particular frequency band.

6. The apparatus according to claim 1, further comprising a control unit configured to control that the AC power signal is dynamically analyzed and/or combined by the recognition unit and/or the combination unit according to a power receiving efficiency, a level of voltage or current, or a requirement for a subject charging device, or to engage with a processing system equipped in the apparatus or an external device so as to control the recognition unit and/or the combination unit.

7. The apparatus according to claim 6, wherein the control unit comprises a feedback unit configured to feedback operational results of the recognition unit and/or the combination unit.

8. The apparatus according to claim 1, wherein the combination unit comprises a power combiner.

9. A method for receiving a wireless power signal, comprising:
   detecting an AC power signal having a plurality of components generated by a plurality of wireless charging techniques;
   analyzing the AC power signal to recognize a wireless charging technique corresponding to each of the plurality of components;
   generating a reference signal used for detecting and filtering the plurality of components of the AC power signal to generate a plurality of filtered components when the AC power signal includes the plurality of components generated based on the plurality of wireless charging techniques;
   rectifying the plurality of filtered components to generate a plurality of rectified components;
   combining the plurality of rectified components into a single DC signal; and
   charging a battery by using the DC signal,
   wherein the plurality of wireless charging techniques comprise a first electromagnetic induction method and a second electromagnetic induction method, and the first electromagnetic induction method has a power signal and a feedback signal of different structure and/or different information than a power signal and a feedback signal of the second electromagnetic induction method.

10. The method according to claim 9, wherein the plurality of wireless charging techniques further comprise a charging method using at least one of magnetic resonance and a radio frequency signal.

11. The method according to claim 10, wherein the first electromagnetic induction method comprises a way which is standardized by the Wireless Power Consortium (WPC), the second electromagnetic induction method comprises a way which is standardized by the Power Matters Alliance (PMA), the charging method using the magnetic resonance comprises a way which is standardized by the Alliance for Wireless Power (A4WP), and the charging method using the radio frequency signal comprises a way using a radio-wave or a microwave.

12. The method according to claim 9, wherein the detecting the AC power signal comprises controlling at least one of a coil and an antenna according to the plurality of wireless charging techniques.

13. The method according to claim 9, wherein the analyzing the AC power signal and the combining the plurality of filtered components are controlled according to a power receiving efficiency, a level of voltage or current, or a requirement for a subject charging device.

14. The method according to claim 13, further comprising feeding back results of the analyzing the AC power signal and the combining the plurality of filtered components.

15. An apparatus for transmitting a wireless power signal, comprising:

a signal generator configured to generate a plurality of power signals which are transferred according to a plurality of wireless charging techniques;

a mixer configured to mix at least two of the plurality of power signals into an AC power signal having at least two components according to a combination possibility of the plurality of power signals; and wherein the plurality of wireless charging techniques comprise a first electromagnetic induction method and a second electromagnetic induction method, and the first electromagnetic induction method has a power signal and a feedback signal of different structure and/or different information than a power signal and a feedback signal of the second electromagnetic induction method, and wherein the plurality of power signals generated according to the first electromagnetic induction method and the second electromagnetic induction method are mixed into the AC power signal.

16. The apparatus according to claim 15, wherein if the plurality of power signals have no combination possibility, the mixer delivers the plurality of power signals into the transmitter respectively without mixing.

* * * * *